(12) United States Patent
Schwengler et al.

(10) Patent No.: US 7,272,130 B2
(45) Date of Patent: Sep. 18, 2007

(54) CDMA DEVICE WITH AUTOMATIC BIT RATE ALLOCATION

(75) Inventors: Thomas Schwengler, Lakewood, CO (US); Brian Louis Arend, Loveland, CO (US)

(73) Assignee: Quest Communications International, Inc., Denver, CO (US)

( * ) Notice: Subject to any disclaimer, the term of this patent is extended or adjusted under 35 U.S.C. 154(b) by 1037 days.

(21) Appl. No.: 10/125,168

(22) Filed: Apr. 18, 2002

(65) Prior Publication Data

US 2003/0198209 A1 Oct. 23, 2003

(51) Int. Cl.
*H04B 7/216* (2006.01)
*H04J 13/00* (2006.01)

(52) U.S. Cl. .................. 370/342; 370/335; 370/479

(58) Field of Classification Search .............. 370/335, 370/342, 479
See application file for complete search history.

(56) References Cited

U.S. PATENT DOCUMENTS 6,421,374 B2 * 7/2002 Blakeney et al. ........... 375/220
6,975,879 B1 * 12/2005 Aalto et al. .................. 455/522
2002/0183064 A1 * 12/2002 Gopalakrishnan et al. .. 455/452

OTHER PUBLICATIONS

Document from World Wide Web (http://www.cdg.org/tech/vocoder/index.asp) entitled "CDMA Technology".
Document from World Wide Web (http://www.ensigma.com/News/InTheNews/VoiceVixe.htm) published by ENSIGMA Technologies: 'Wireless Review'—Jun. 15, 2001 by Chris Goldman, Data Editor, entitled "Voice Vise".

* cited by examiner

*Primary Examiner*—Chi Pham
*Assistant Examiner*—Ronald Abelson
(74) *Attorney, Agent, or Firm*—Robert G. Crouch; Gregory T. Fettig; Marsh Fischmann & Breyfogle

(57) ABSTRACT

CDMA transmitter device including bit rate control logic that dynamically adjusts bit rates allocated to new incoming calls and currently active calls based on the current power level of the transmitter device and a call priority for the currently active calls and the incoming calls. The bit rate control logic uses the current power level of the transmitter device and the call priority to allocate lower bit rates to lower priority calls and higher bit rates to higher priority calls to maintain operation of the transmitter device at or below a maximum operating power level.

21 Claims, 6 Drawing Sheets

| BS Power Level | Bit Rate Allocation |
|---|---|
| <90% of Max Power | allowed rate |
| 70% to 90% | < 10.2 kb/s |
| 40% to 70% | < 9.6 kb/s |
| < 40% | < 4.8 kb/s |

FIG. 5

CDMA DEVICE WITH AUTOMATIC BIT RATE ALLOCATION

FIELD OF THE INVENTION

The invention is related to the field of wireless communication services, and in particular, to a Code Division Multiple Access transmitter device that dynamically controls the bit rates allocated to calls based on a power level of the transmitter device and call priority.

BACKGROUND OF THE INVENTION

Code Division Multiple Access ("CDMA") is a digital technology commonly used in wireless communication systems. In a CDMA system, a CDMA device, such as a base station, transmits a CDMA signal to numerous communication devices, such as wireless CDMA handsets. CDMA is a "spread spectrum" technology that assigns a unique code to all bits, transmits a scrambled CDMA signal of encoded bits, and reassembles the bits in their original format.

In a CDMA signal, the individual calls are not separated based on frequency or time, but are spread across an entire frequency band. Each individual call is encoded with a unique pseudo random sequence. The CDMA device then combines the encoded signals together to form a radio frequency ("RF") CDMA signal. The receiving communication device uses the unique pseudo random sequence to derive and receive a particular call.

CDMA systems utilize orthogonal and pseudo orthogonal sequences in order to simultaneously carry a plurality of channels. Each channel requires power to transmit its bit stream, which also generates noise for other channels in the same band. Therefore, the power level of any bit stream has a direct impact on the system's capacity and the system is said to be interference limited.

To prevent operation above a maximum power level during high traffic periods, CDMA devices utilize call-blocking technology. Call-blocking technology is initiated during high traffic periods to limit the number of calls processed by the CDMA device. During periods where call blocking is initiated, at least a portion of new calls are blocked to maintain current traffic loads and channel power that result in system operation at or below the maximum power level. Such call-blocking, however, is generally undesirable as it has the obvious disadvantage of dissatisfied customers.

One solution to mitigate the problem of blocking calls during high traffic periods is to adjust the bit rate allocated to calls based on the current voice activity over the CDMA device. The method works by allocating a lower bit rate to voice calls during higher or peak traffic periods, and allocating a higher or standard bit rate during lower or off peak traffic periods. This permits the CDMA device to accommodate more calls before call blocking is implemented. Unfortunately, this method automatically lowers bit rate allocations to calls regardless of other factors for the call, such as class of service.

SUMMARY OF THE INVENTION

The present invention advances the art by providing a CDMA transmitter device with bit rate control logic that dynamically adjusts bit rates allocated to new incoming calls and currently active calls based on the current power level of the device and a call priority for the currently active calls and the incoming calls. Advantageously, by looking at the power level of the transmitter device as well as the call priority for the active and incoming calls, the bit rate control logic accounts for the available capacity of the device, maximizes the number of calls handled before call blocking is implemented, and maintains quality of service according to a class of service subscribed to by customers of the service provider.

According to one aspect of the present invention, a CDMA transmitter comprising base station control logic, call priority logic and bit rate allocation is provided. The base station control logic is configured to determine the current power level of the base station based on a number of currently active calls in the base station. The call priority logic is configured to determine a call priority for new incoming calls based on a class of service for the new incoming calls. The bit rate allocation logic is configured to automatically allocate bit rates to the new incoming calls based on the current power level and the call priority and to adjust bit rates allocated to currently active calls based on the current power level and the call priority to prevent call blocking and maintain operation of the transmitter at or below a maximum operating power.

In one example of the present invention, the bit rate control logic uses the current power level of the base station and the call priority to allocate lower bit rates to lower priority calls and higher bit rates to higher priority calls, e.g. high priority calls, such as 911 calls, that cannot afford a reduced quality of service are typically not assigned a lower bit rate, while normal priority calls, or calls in a lower class of service where a slightly reduced quality of service outweighs a blocked call are typically assigned a lower bit rate. For example, upon receiving a new call, the bit rate control logic could automatically lower the bit rate allocated to at least one currently active call if the current power level of the base station is greater than a predetermined threshold power level and the new call includes a high call priority. In another example, upon receiving a new call, the bit rate control logic could allocate a lower bit rate to the new call if the current power level is greater than the predetermined threshold power level but the call priority for the new call is low. In another example, upon receiving a new incoming call, the bit rate control logic could allocate a higher bit rate to the new call regardless of the call priority if the current power level is less than the predetermined threshold power level. In yet another example of the present invention, the bit rate control logic could incrementally apply lower bit rate allocations to currently active calls having a low priority to maintain a constant power level at or near the threshold power level of the device. It should be noted that if the current power level falls below the threshold power level, the bit rate control logic raises the bit rate allocated to at least a portion of the calls based on the priority, e.g. calls with higher priority are increased first followed by calls with a lower priority.

In another example of the present invention, the bit rate control logic compares the current power level of the CDMA transmitter device to a plurality of threshold power levels to determine a specific bit rate to allocate to low priority incoming calls and currently active calls. Each of the plurality of threshold power levels corresponds to a bit rate allocation to be used if the current power level falls within that threshold. The bit rate control logic assigns bit rate allocations to the low priority calls based on the bit rate corresponding to the threshold power level that includes the current power level of the CDMA transmitter.

In another example of the present invention, the CDMA transmitter device includes short message service logic that is used to provide messages to call devices indicating to the user of the device that a call will be processed at a lower bit rate or a bit rate for a currently active call will be lowered. In the case of a new incoming call, the message could provide the user with the option of placing the call at the lower bit rate or waiting to place the call until system resources are freed and the lower bit rate allocation becomes unnecessary.

BRIEF DESCRIPTION OF THE DRAWINGS

FIG. 5 is a logic table used to allocate bit rates in an example of the present invention.

DETAILED DESCRIPTION

Figure 1:
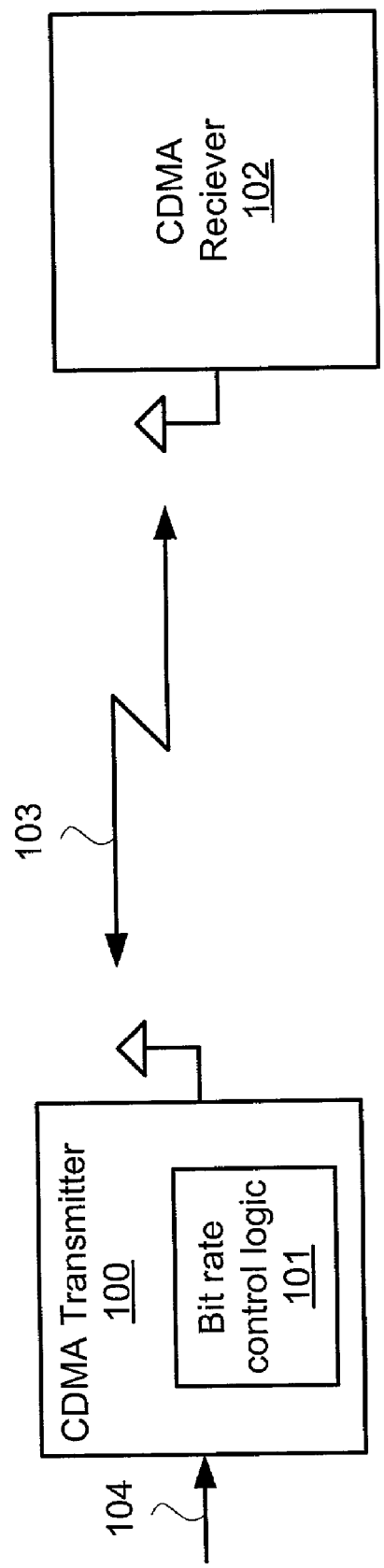
FIG. 1 illustrates a CDMA transmitter device and bit rate control logic according to the present invention.
Figure 2:
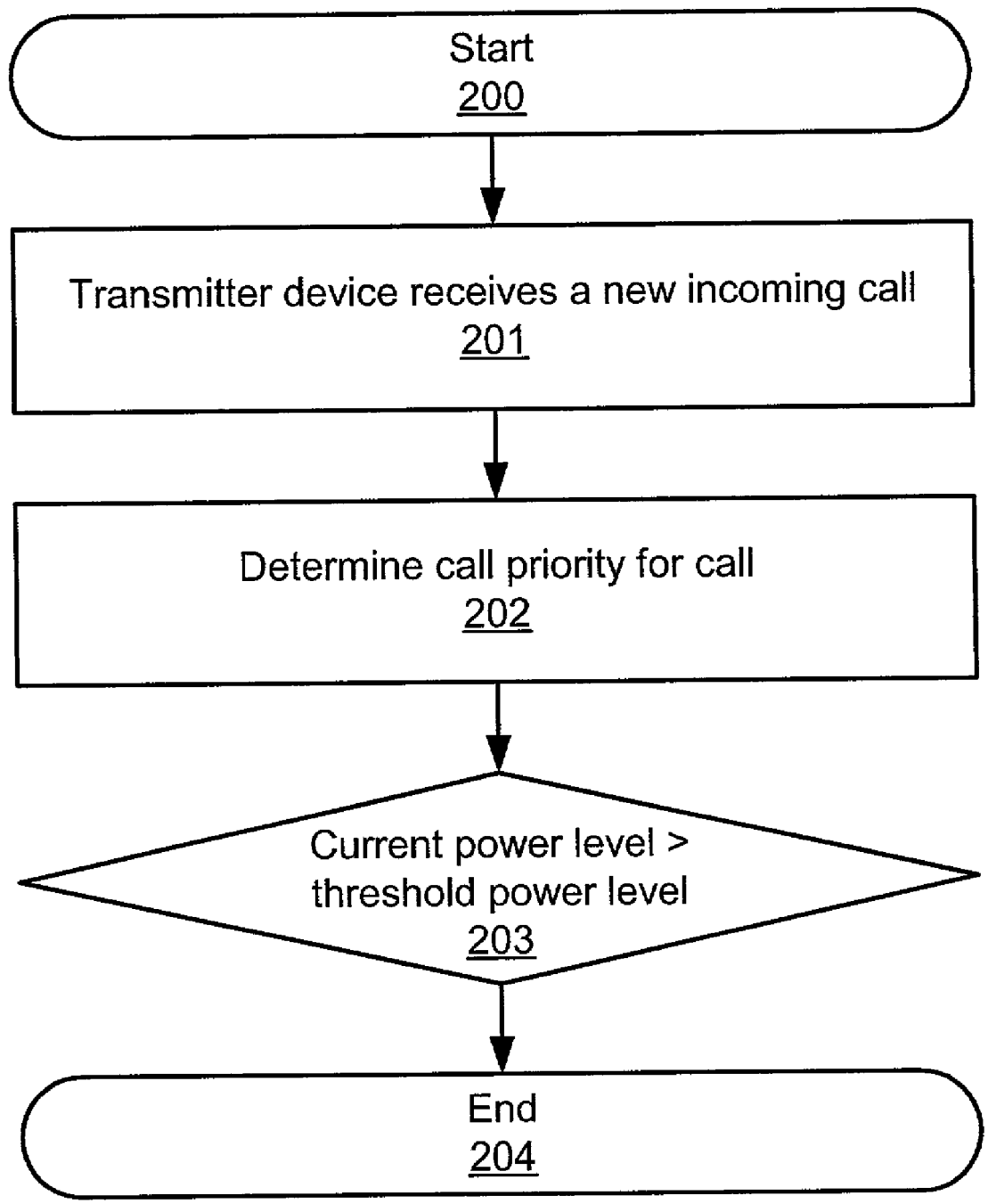
FIG. 2 is a flow chart illustrating an example of the operation of the CDMA transmitter device and bit rate control logic according to the present invention.

CDMA Transmitter Device and Operation FIGS. 1-2

FIG. 1 depicts a CDMA transmitter 100, a communications signal 104, an RF CDMA signal 103, and CDMA receiver 102. The CDMA transmitter 100 includes bit rate control logic 101. The communications signal 104 could be any signal, such as the signal received from a network switching system. The RF CDMA signal 103 could be a conventional CDMA signal comprising the modulated communications signal 104 with intermediate and radio frequencies.

The CDMA transmitter 100 transmits the RF CDMA signal 103 to the CDMA receiver 102. The CDMA transmitter 100 could be any CDMA device configured with the bit rate control logic 101. Some examples of the CDMA transmitter 100 include without limitation, a CDMA base station and a CDMA handset device.

CDMA is a spread spectrum digital technology that assigns a unique identifying code to all calls and then transmits combined call signals over the same broad frequency spectrum. In the CDMA transmitter 100, the power level is largely determined by the bit rate allocation for individual calls processed by the transmitter 100 over the individual channels. The higher the bit rate allocation for a call over a channel, the more overall power is required to transmit the CDMA signal 103. Similarly, the lower the bit rate allocation for individual calls over a channel, the less overall power is required to transmit the CDMA signal 103.

The bit rate control logic 101 could be any circuitry or logic that monitors the power level of the CDMA transmitter 100 to determine a current power level for the transmitter 100 based on a number of currently active calls processed by the transmitter 100. The bit rate control logic 101 uses the current power level of the transmitter 100 along with a priority for the currently active calls and new incoming calls to assign lower and/or higher bit rates to at least a portion of the currently active calls and the new incoming calls as a function of the call priority. If the bit rate allocation for at least a portion of the calls should be adjusted, the bit rate control logic 101 adjusts the bit rate allocated to the at least a portion of the currently active voice calls and/or new incoming calls based on the current power level and the priority of the calls.

In one example of the operation, the bit rate control logic 101 compares the current power level of the CDMA transmitter 100 to a pre-determined threshold power level. If the current power level exceeds the threshold power level, the bit rate control logic 101 looks at the priority of an incoming call to determine if a lower bit rate should be allocated to the new incoming call or if the bit rate allocated to a currently active call should be lowered to accommodate the new call at a higher or standard bit rate. For example, if the new call includes a high call priority, the bit rate control logic 101 lowers the bit rate allocation to at least one currently active call having a lower priority. This permits the CDMA transmitter 100 to accommodate the new call at the higher or standard bit rate while operating at or below the maximum power level. If on the other hand, the new call includes a low call priority, the bit rate control logic 101 assigns a lower bit rate to the new call to permit accommodation of the new call without call blocking, and permit operation of the transmitter 100 at or below the maximum power level.

In another example of the operation, the bit rate control logic 101 compares the current power level of the CDMA transmitter 100 to a plurality of threshold power levels. The plurality of threshold power levels each corresponds to a bit rate allocation to be used if the current power level falls within that threshold power level. In this case, the bit rate control logic 101 could apply the bit rate allocation corresponding to the threshold power level to all calls having a low priority. In another example, the bit rate control logic 101 could apply the bit rate allocation corresponding to the threshold power level to all calls regardless of the call priority.

FIG. 2 is a flow chart illustrating the operation of the CDMA transmitter device 100 configured with the bit rate control logic 101 according to the present invention. In this example, a predetermined threshold power level of sixty percent (60%) of the maximum power level of the CDMA transmitter 100 is used. Those skilled in the art will appreciate, however, that the pre-determined threshold power level of 60%, is used in this example for the purpose of illustration and not limitation. Thus, the pre-determined threshold power level will vary according to the specifications for individual CDMA transmitters as well as the desired quality of service provided over those transmitters.

On FIG. 2, the operation begins at step 200. At step 201, the transmitter device 100 receives a new incoming call. At step 202, the transmitter device 100 processes the call to determine a call priority for the call. In this example, the new incoming call includes a high call priority. The call priority could be any priority associated with the call that distinguishes the call from other calls having a different priority. In one example of the present invention, the class of service subscribed to determines the call priority. For example, calls placed by users subscribing to a high class of service are given a high call priority while calls placed by users subscribing to a lower class of service are given a lower call priority.

At step 203, the bit rate control logic 101 determines a current power level for the transmitter device 100. If at step 203, the current power level is less than the (60%) threshold power level, the bit rate control logic 101 processes the new call to place the call at a standard bit rate. If at step 203, however, the current power level is equal to or greater than the (60%) threshold power level, the bit rate control logic 101 automatically lowers the bit rate allocated to at least one of the currently active calls having a lower call priority than the incoming call. It should be noted that the bit rate for the at least one currently active call could be significantly lowered to accommodate the new call without significantly raising the current power level of the transmitter 100. Alternatively, the bit rate could be lowered for multiple currently active calls having a lower priority to accommodate the new call without significantly raising the current power level of the transmitter 100.

Continuing with the above example where the bit rate allocated to at least one currently active call was lowered, the bit rate control logic 101 again determines the current power level of the transmitter device 100. If at step 203, the current power level falls below the threshold power level, e.g. a portion of the currently active calls have terminated, the bit rate control logic 101 increases the bit rate allocated to at least one of the currently active calls assigned a lower bit rate. Advantageously, using the above-described algorithm, the bit rate control logic 101 accounts for the available capacity of the transmitter 100, maximizes the number of calls handled before call blocking is implemented, and maintains quality of service according to a class of service subscribed to by customers of the transmitter 100.

System Architecture and Operation Examples FIGS. 3-6

Figure 3:
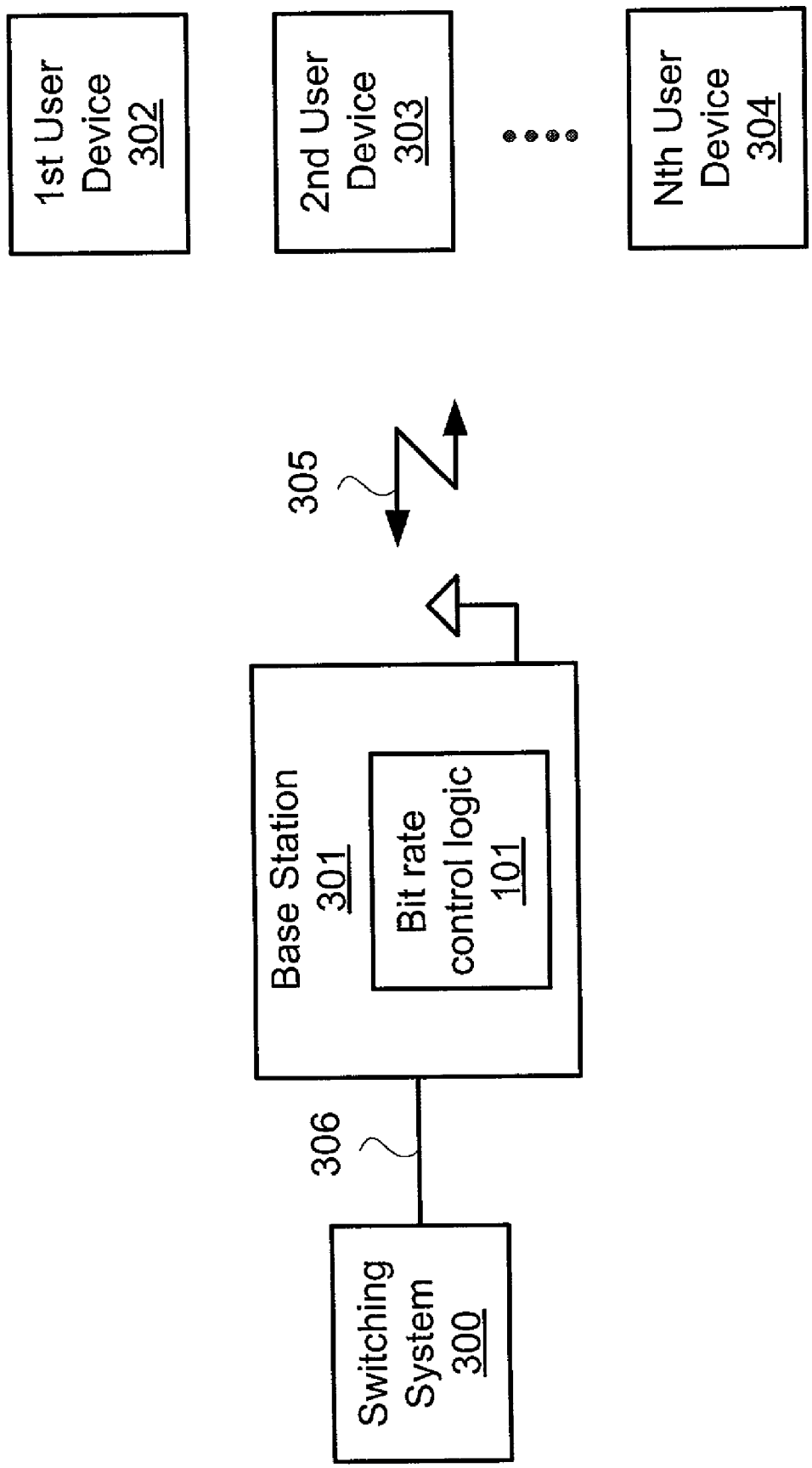
FIG. 3 illustrates a CDMA system including a CDMA base station and bit rate control logic according to the present invention.

FIG. 3 illustrates an example of a system architecture according to the present invention, but those skilled in the art will recognize numerous other configurations that are applicable to the examples described herein. Those skilled in the art will also appreciate how combinations of features described below can be combined with the above examples to form multiple other examples of the present invention.

FIG. 3 depicts a switching system 300, a base station 301, a first CDMA user device 302, a second CDMA user device 303, and an Nth CDMA user device 304. The base station 301 comprises the bit rate control logic 101. Those skilled in the art will appreciate that the base station 301 could communicate with numerous other CDMA user devices, although only devices 302-304 are shown on FIG. 3 for clarity.

The switching system 300 exchanges communications 306 with the base station 301. The switching system 300 could be a conventional switching system that provides an interface between the base station 301 and one or more communication networks. Those skilled in the art will appreciate that numerous base stations are typically connected to the switching system 300, although only base station 301 is shown on FIG. 3 for clarity. Some examples of the communication networks could include the public switched telephone network, a packet network, a local area network, a wide area network, and/or the Internet.

The base station 301 exchanges CDMA communications 305 with the first, second, and Nth CDMA user devices 302-304. The base station 301 includes the bit rate control logic 101 that forces bit rate allocations to calls, incoming or currently active, based on the power level of the base station 301 and the call priority for an incoming call.

The CDMA user devices 302-304 communicate with other devices as well as each other through the base station 301. During these communications, the bit rate control logic 101 controls the bit rate allocated to individual voice calls for the devices 302-304 to maximize the number of calls supported by the base station 301 before call blocking is initiated. The CDMA user devices 302-304 could be conventional user devices configured to exchange the CDMA signal 305 with the base station 301. Some examples of the CDMA user devices 302-304 include without limitation portable handset telephone devices configured for voice traffic or data terminals configured for data traffic.

Figure 4:
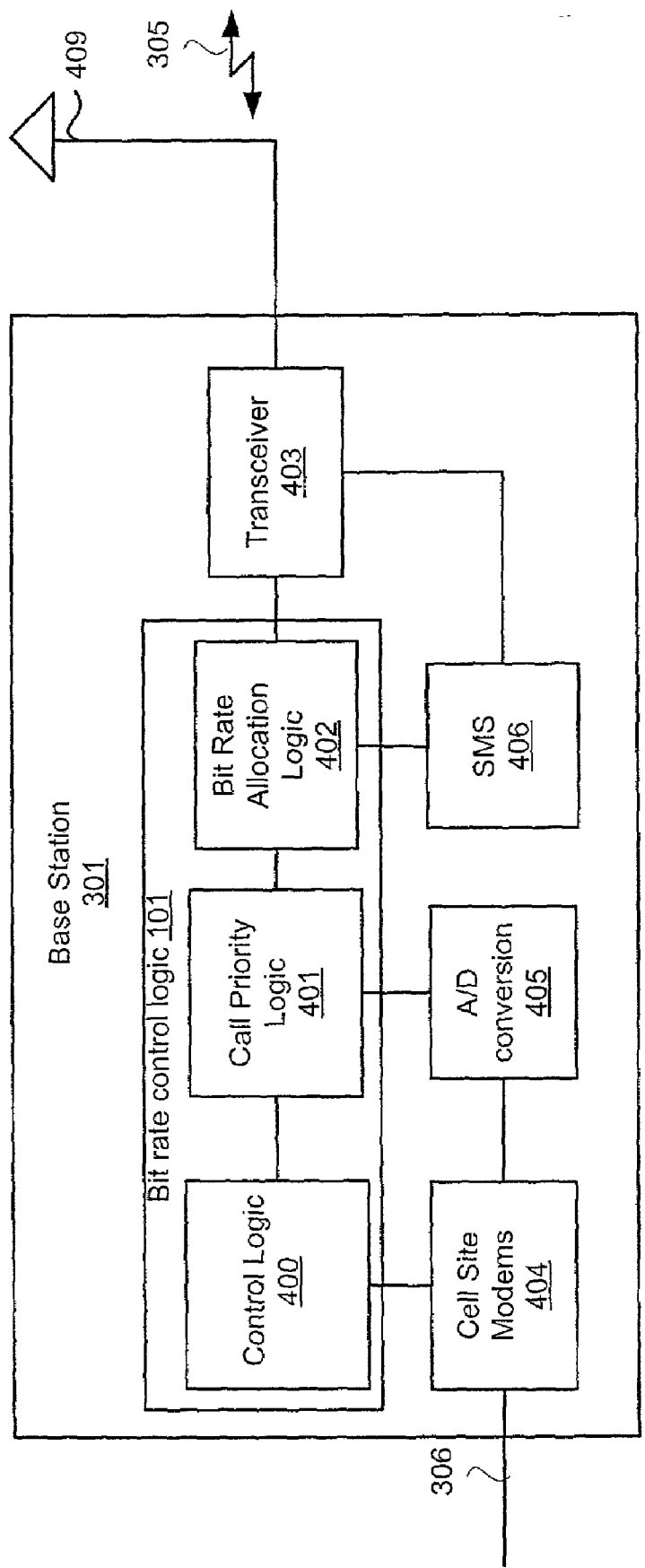
FIG. 4 illustrates additional details of the CDMA base station and bit rate control logic of FIG. 3.

FIG. 4 depicts a detailed illustration of the base station 301. The base station 301 comprises the bit rate control logic 101, cell site modems 404, analogue to digital conversion 405, transceiver 403, and short message service logic ("SMS") 406. The bit rate control logic 101 comprises base station control logic 400, call priority logic 401, and bit rate allocation logic 402.

The bit rate allocation logic 402 is connected to the call priority logic 401, the transceiver 403, and the SMS logic 406. The transceiver 403 is connected to the base station antenna 409. The cell site modems 404 are connected to the control logic 400 and the analogue to digital conversion 405. The call priority logic 401 is connected to control logic 400 and the analogue to digital conversion 405.

The cell site modems 404 exchange communications 306 between the switching system 300 and the base station 301. The cell site modems 404 also produce the base band CDMA signal for incoming communications from the switching system 300. The analogue to digital conversion 405 converts incoming analogue signals from the switching system 300 to digital signals and converts outgoing digital signals from the CDMA user devices 302-304 to analogue signals. The base station control logic 400 determines the current power level of the base station 301 based on the number of currently active calls and provides power level information to the bit rate allocation logic 402. The call priority logic 401 receives class of service information from incoming calls and determines a call priority for the incoming calls. The call priority logic 401 provides the call priority information to the bit rate allocation logic 402. The bit rate allocation logic 402 uses the power information from the base station control logic 400 and the call priority information from the call priority logic 401 to allocate bit rates for new incoming calls and adjust bit rates allocated to currently active calls. The bit rate allocation logic 402 also modulates the incoming CDMA signal from the analogue to digital conversion 405 with intermediate and radio frequencies to form the CDMA signal 305 for the transceiver 403, and demodulates the incoming RF CDMA signal 305 from the devices 302-304 to form a base band CDMA signal for the analogue to digital conversion 405. The transceiver 403 exchanges the RF CDMA signal 305 over the antenna 409 with the CDMA user devices 302-304.

The SMS logic 406 could be conventional short message service logic configured to send alphanumeric messages to the CDMA user devices 302-304. In some examples of the present invention, the bit rate allocation logic 402 uses the SMS logic 406 to provide messages to the CDMA user devices 302-304. For example, if the bit rate allocation logic 402 determines that a call should be processed using a lower bit rate allocation, the bit rate allocation logic 402 uses the SMS logic 406 to send a message to a calling device, e.g. 302. The message could indicate to the user of the device 302 that the capacity of the base station 301 is full and the bit rate allocation for the call will be lowered. In the case of a new call, the message could prompt the user of the device 302 for a response, such as "capacity full, connect call at lower rate, yes/no".

FIG. 5 depicts an example of a logical table 500 containing a plurality of pre-determined thresholds and corresponding bit rate allocations. Those skilled in the art will appreciate that the thresholds and bit rate allocations included in the table 500 are used for the purpose of illustration and not limitation and the threshold and bit rate allocations will vary according to the specifications of the base station 301.

Figure 6:
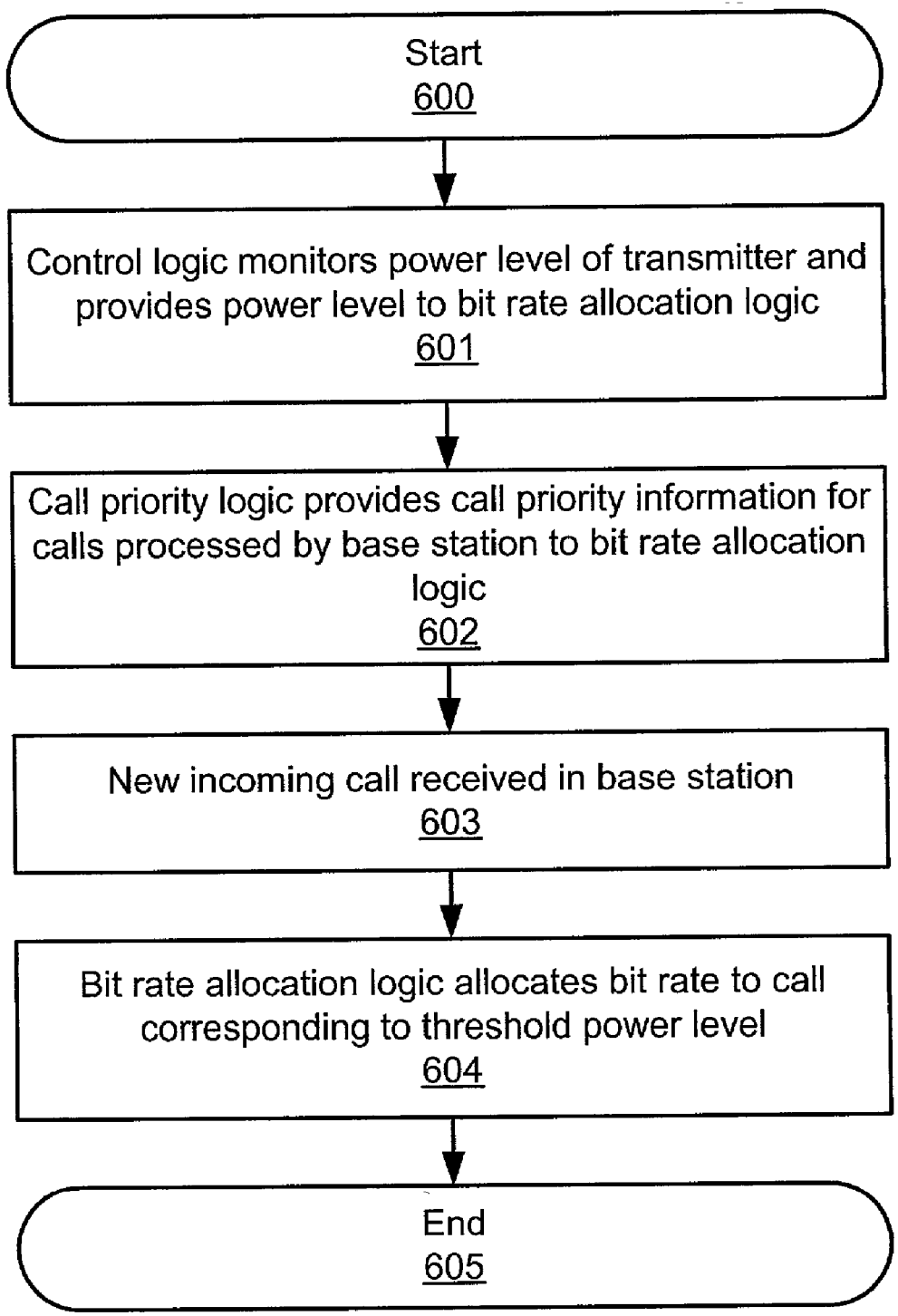
FIG. 6 is flow chart illustrating another example of the operation of a CDMA transmitter device and bit rate control logic according to the present invention.

FIG. 6 is flow chart illustrating an example of the operation of the bit rate control logic 101 using the logic table 500. On FIG. 6, the operation begins at step 600. At step 601, the control logic 400 continually monitors the power level of the base station 301 and provides the power level information to the bit rate allocation logic 402. At step 602, the call priority logic 401 provides the call priority information for the calls processed by the base station 301 to the bit rate allocation logic 402. At step 603, a new incoming call is received in the base station 301. At step 604, the bit rate allocation logic 402 allocates a bit rate to the new incoming call corresponding to the threshold level that includes the current power level of the base station 301. For example, if the current power level is <90% of the maximum power level as indicated by the control logic 400, the bit rate allocation logic 402 allocates any allowed bit rate for the call. In another example, where the current power level is in the 70% to 90% range as indicated by the control logic 400, the bit rate control logic 401 uses the call priority for the incoming call to allocate a bit rate for the new incoming call. If the new incoming call includes a high priority, the bit rate control logic 401 allocates a higher bit rate to the new incoming call. Substantially simultaneously, the bit rate control logic 401 adjusts the bit rate for at least one of the currently active calls to a bit rate of <10.2 kb/s. If, however, the new incoming call includes a low priority, the bit rate control logic 401 allocates a bit rate of <10.2 kb/s to the new incoming call.

In another example, where the current power level is in the 40% to 70% range as indicated by the control logic 400, the bit rate control logic 401 uses the call priority for the incoming call to allocate a bit rate for the new incoming call. If the new incoming call includes a high priority, the bit rate control logic 401 allocates a higher bit rate to the new incoming call. Substantially simultaneously, the bit rate control logic 401 adjusts the bit rate for at least one of the currently active calls to a bit rate of <9.6 kb/s. If, however, the new incoming call includes a low priority, the bit rate control logic 401 allocates a bit rate of <9.6 kb/s to the new incoming call.

In another example, where the current power level is <40% as indicated by the control logic 400, the bit rate control logic 401 uses the call priority for the incoming call to allocate a bit rate for the new incoming call. If the new incoming call includes a high priority, the bit rate control logic 401 allocates a higher bit rate to the new incoming call. Substantially simultaneously, the bit rate control logic 401 adjusts the bit rate for at least one of the currently active calls to a bit rate of <4.8 kb/s. If, however, the new incoming call includes a low priority, the bit rate control logic 401 allocates a bit rate of <4.8 kb/s to the new incoming call.

It should also be noted, that in any of the above examples, the bit rate allocation logic 402 could use the SMS logic 406 to send a message to the calling device, e.g. 302 that receives the lower bit rate allocation. The message could indicate to the user of the device 302 that the capacity of the base station 301 is full and the call will be placed at a lower bit rate or the current bit rate will be lowered for the current call. In another example, the message could also indicate the new bit rate for the call.

The above-described elements are comprised of instructions that are stored on storage media. The instructions could be retrieved and executed by a processing system. Some examples of instructions are software, program code, and firmware. Some examples of storage media are memory devices, tape, disks, integrated circuits, and servers. The instructions are operational when executed by the processing system to direct one or more processors to operate in accord with the invention. The term "processing system" refers to a single processing device or a group of inter-operational processing devices. Some examples of processing systems are integrated circuits and logic circuitry. Those skilled in the art are familiar with instructions, processing systems, and storage media.

Those skilled in the art will appreciate variations of the above-described embodiments that fall within the scope of the invention. As a result, the invention is not limited to the specific examples and illustrations discussed above, but only by the following claims and their equivalents.

We claim:

1. A Code Division Multiple Access ("CDMA") base station configured to exchange communications between a plurality of CDMA user devices and a communication network, the CDMA device comprising:
   base station control logic to determine the current power level of the base station based on a number of currently active calls in the base station;
   call priority logic to determine a call priority for new incoming calls based on a class of service for the new incoming call;
   bit rate allocation logic to automatically allocate bit rates to the new incoming calls based on the current power level and the call priority for the new incoming calls, wherein the bit rate allocation logic is configured to automatically lower the bit rate allocated to at least one currently active call based on the current power level of the base station and the call priority for the new incoming call, wherein the call priority comprises one of a high priority and a low priority and wherein the base station control logic is configured to compare the current power level of the base station to a plurality of pre-determined threshold power levels, wherein each of the plurality of pre-determined threshold power levels corresponds to an individual one of a plurality of bit rate allocations.

2. The base station of claim 1, wherein the bit rate control logic is configured to allocate a lower bit rate to a new incoming call if the current power level is greater than a predetermined threshold power level and the call priority for the new incoming call is low priority.

3. The base station of claim 1, wherein the bit rate control logic is configured to allocate a higher bit rate to the new incoming call if the current power level is less than the predetermined threshold power level and the call priority for the new incoming call is one of low priority and high priority.

4. The base station of claim 1, wherein the bit rate control logic is configured to lower the bit rate allocated to at least one currently active call having low priority if the current power level is greater than the predetermined threshold power level and the call priority for the new incoming call is high priority.

5. The base station of claim 4, wherein the bit rate control logic is configured to increase the bit rate allocated to the at least one currently active call if the current power level falls below the pre-determined threshold power level.

6. The base station of claim 1, wherein the bit rate control logic is configured to lower the bit rate allocated to the at least one currently active call to the individual one of the plurality of bit rate allocations corresponding to the individual one of the pre-determined threshold power levels that includes the current power level.

7. The base station of claim 1, wherein the bit rate control logic is configured to allocate the individual one of the plurality of bit rate allocations to the new incoming call corresponding to the individual one of the pre-determined threshold power levels that includes the current power level.

8. The base station of claim 1 comprising:
short message service logic to provide a message that indicates the bit rate being allocated to the new incoming call.

9. The base station of claim 8, wherein the short message service logic is configured to provide a message that indicates the bit rate allocated to the at least one currently active call is being lowered.

10. A software product for use in operating a Code Division Multiple Access ("CDMA") device, the product comprising:
base station control instructions operational when executed on a processor to direct the processor to determine the current power level of the base station based on a number of currently active calls in the base station;
call priority instructions operational when executed by the processor to determine a call priority for new incoming calls based on a class of service for the new incoming calls;
bit rate allocation instructions operational when executed by the processor to automatically allocate bit rates to the new incoming calls based on the current power level and the call priority for the new incoming calls;
a storage medium storing the bit rate control instructions, the call priority instructions, and the bit rate allocation instructions, wherein the bit rate allocation instructions are operational when executed by the processor to automatically lower the bit rate allocated to at least one currently active call based on the current power level of the base station and the call priority for the new incoming calls, wherein the call priohty comprises one of high priority and a low priority and wherein the bit rate control instructions are operational when executed by the processor to allocate a lower bit rate to a new incoming call it the current power level is greater than a predetermined threshold power level and the call priority for the new incoming call is low priority.

11. The product of claim 10, wherein the bit rate control instructions are operational when executed by the processor to allocate a higher bit rate to the new incoming call if the current power level is less than the predetermined threshold power level and the call priority for the new incoming call is one of low priority and high priority.

12. The product of claim 10, wherein the bit rate control instructions are operational when executed by the processor to lower the bit rate allocated to at least one currently active call having low priority if the current power level is greater than the predetermined threshold power level and the call priority for the new incoming call is high priority.

13. The product of claim 10, wherein the bit rate control instructions are operational when executed by the processor to increase the bit rate allocated to the at least one currently active call if the current power level falls below the pre-determined threshold power level.

14. The product of claim 10, wherein the base station control instructions are operational when executed by the processor to compare the current power level of the base station to a plurality of pre-determined threshold power levels, wherein each of the plurality of pre-determined threshold power levels corresponds to an individual one of a plurality of bit rate allocations.

15. The product of claim 14, wherein the bit rate control instructions are operational when executed by the processor to lower the bit rate allocated to the at least one currently active call to the individual one of the plurality of bit rate allocations corresponding to the individual one of the pre-determined threshold power levels that includes the current power level.

16. The product of claim 14, wherein the bit rate control instructions are operational when executed by the processor to allocate the individual one of the plurality of bit rate allocations to the new incoming call corresponding to the individual one of the pre-determined threshold power levels that includes the current power level.

17. The product of claim 10, further including short message service instructions operational when executed by the processor to provide a message that indicates the bit rate being allocated to the new incoming call, wherein the short message service instructions are operational when executed by the processor to provide a message that indicates the bit rate allocated to the at least one currently active call is being lowered.

18. The product of claim 10 comprising:
short message service instructions operational when executed by the processor to provide a message that indicates the bit rate being allocated to the new incoming call.

19. A method for Code Division Multiple Access ("CDMA") call processing, the method comprising:
determining a current power level of a CDMA base station based on a number of currently active calls in the base station;
receiving a new incoming call in the base station;
determining a call priority for the new incoming call based on a class of service for the new incoming call;
automatically allocating a bit rate to the new incoming call based on the current power level of the base station and the call priority for the new incoming call; and
automatically lowering the bit rate allocated to at least one currently active call based on the current power level of the base station and the call priority for the new incoming call, wherein the call priority comprises one of a high priority and a low priority and wherein the method further comprises comparing the current power level of the base station to a plurality of pre-determined threshold power levels, wherein each of the plurality of pre-determined threshold power levels corresponds to an individual one of a plurality of bit rate allocations.

20. The method of claim 19, wherein the step of automatically lowering the bit rate allocated to at least one currently active call comprises:
lowering the bit rate allocated to the at least one currently active call to the individual one of the plurality of bit rate allocations corresponding to the individual one of the pre-determined threshold power levels that includes the current power level.

21. The method of claim 19, wherein the step of automatically allocating the bit rate comprises:
allocating the individual one of the plurality of bit rate allocations to the new incoming call corresponding to the individual one of the pre-determined threshold power levels that includes the current power level.

* * * * *